United States Patent
Eakins et al.

(10) Patent No.: US 9,549,441 B2
(45) Date of Patent: Jan. 17, 2017

(54) LIGHTING DEVICE TO SIMULATE NATURAL MOTION

(71) Applicant: The Boeing Company, Chicago, IL (US)

(72) Inventors: Mark Edward Eakins, Kirkland, WA (US); Alexey Meerov, Mukilteo, WA (US); Martin Clive Adams, Everett, WA (US)

(73) Assignee: The Boeing Company, Chicago, IL (US)

(*) Notice: Subject to any disclaimer, the term of this patent is extended or adjusted under 35 U.S.C. 154(b) by 64 days.

(21) Appl. No.: 14/221,103

(22) Filed: Mar. 20, 2014

(65) Prior Publication Data

US 2015/0271885 A1 Sep. 24, 2015

(51) Int. Cl.
*H05B 37/02* (2006.01)
*H05B 33/08* (2006.01)
(Continued)

(52) U.S. Cl.
CPC .......... *H05B 33/0845* (2013.01); *B64D 11/00* (2013.01); *F21S 10/00* (2013.01);
(Continued)

(58) Field of Classification Search
CPC . H05B 33/08; H05B 33/0809; H05B 33/0845; H05B 33/0887; H05B 37/02; H05B 37/029
(Continued)

(56) References Cited

U.S. PATENT DOCUMENTS 6,241,362 B1  6/2001  Morrison
6,964,481 B2 * 11/2005  Pho ........................ A47C 1/13
                                                         353/12
(Continued)

FOREIGN PATENT DOCUMENTS

DE  20 2013 101 064 U1  5/2013
EP       2555261 A1     6/2013
(Continued)

OTHER PUBLICATIONS

Jul. 22, 2015 Extended European Search Report for EP Application No. 15158664.

*Primary Examiner* — Tung X Le
(74) *Attorney, Agent, or Firm* — John S. Economou

(57) ABSTRACT

A method and device for generating natural motion lighting patterns on the ceiling of an aircraft cabin are disclosed. The device includes at least two lighting elements, each outputting light. The device also includes a fixed common light modulation element positioned above the at least two lighting elements. Finally, the device includes a controller having outputs coupled to the at least two lighting elements and configured to separately vary an intensity of the light produced by each of the at least two lighting elements such that a light pattern produced by the light from each of the at least two lighting elements passing through the fixed common light modulation element simulates natural motion. The at least two lighting elements are preferably light emitting diodes. The fixed common light modulation element is one of a lens, mask or filter. The device may include additional light modulation elements, either common or for each lighting element.

20 Claims, 7 Drawing Sheets

(51) Int. Cl.
    *B64D 11/00*     (2006.01)
    *F21S 10/00*     (2006.01)
    *G03B 21/00*     (2006.01)

(52) U.S. Cl.
    CPC ......... *H05B 33/08* (2013.01); *H05B 33/0887* (2013.01); *H05B 37/02* (2013.01); *H05B 37/0209* (2013.01); *B64D 2011/0038* (2013.01); *G03B 21/00* (2013.01)

(58) Field of Classification Search
    USPC ... 315/185 R, 186, 291, 294, 297, 312, 360; 362/234, 294; 313/498
    See application file for complete search history.

(56) References Cited

U.S. PATENT DOCUMENTS

| | | | |
|---|---|---|---|
| 8,185,360 | B2 | 5/2012 | Eakins et al. |
| 8,277,053 | B2 | 10/2012 | Vogel et al. |
| 8,461,505 | B2 | 6/2013 | Budinger et al. |
| 8,556,478 | B2 | 10/2013 | Riedel et al. |
| 2004/0237364 | A1* | 12/2004 | Henry ............... G09F 9/33 40/544 |
| 2006/0006821 | A1* | 1/2006 | Singer et al. .............. 315/312 |
| 2006/0208666 | A1 | 9/2006 | Johnson |
| 2008/0218993 | A1* | 9/2008 | Li ............................. 362/84 |
| 2010/0214496 | A1 | 8/2010 | Vogel et al. |
| 2012/0292986 | A1* | 11/2012 | Riedel ............. B60Q 3/0259 307/9.1 |
| 2013/0020929 | A1* | 1/2013 | van de Ven et al. ........ 313/498 |
| 2014/0062297 | A1* | 3/2014 | Bora et al. ................. 315/34 |
| 2015/0115830 | A1* | 4/2015 | Siessegger ......... H05B 33/0803 315/291 |
| 2015/0145410 | A1* | 5/2015 | Backes ............. B60Q 3/0293 315/77 |

FOREIGN PATENT DOCUMENTS

| | | |
|---|---|---|
| GB | 2293443 A | 3/1996 |
| GB | 2406635 A | 4/2005 |
| GB | 2467008 A | 7/2010 |
| JP | 4418922 B1 | 2/2010 |
| WO | 2006059265 A1 | 6/2006 |
| WO | 2010015990 A2 | 2/2010 |
| WO | 2011131197 A1 | 10/2011 |

\* cited by examiner

LIGHTING DEVICE TO SIMULATE NATURAL MOTION

FIELD

This disclosure relates generally to lighting devices, and more particularly, to devices for providing lighting simulating natural motion in the passenger cabin of an aircraft.

BACKGROUND

Aircraft passenger cabins are known to have lighting fixtures designed to illuminate a specific targeted area, such as for reading, sometimes referred to as "task" lighting. Aircraft passenger cabins also are known to have lighting fixtures that direct light along the surfaces of walls and ceilings, sometimes referred to as "general" or "wash" lighting. The illumination pattern produced by the wash lighting is considered to have an effect on the mood and well-being of the passengers.

Traditionally, hidden fluorescent lamps have been used for providing wash lighting, such as along the ceiling of an aircraft passenger cabin. These fluorescent lamps provide a wide variation in surface brightness that may not be ideal for the comfort of the passengers. In addition, the light provided by fluorescent lamps tends to be artificial-looking. It is also known to use fixtures with light emitting diodes (LEDs) as a supplement or replacement for fluorescent lamps to provide wash lighting. However, in this case, although LEDs may provide an illumination pattern in which color changes over time, the pattern of the light remains static.

Digital projectors can be used to provide motion patterns in the cabin illumination, but such projectors are large, expensive and consume a great deal of power. Lower cost and lower power devices exist for producing moving projected patterns, but such devices typically operate by projecting a light source through a lens which is mechanically moved to simulate motion in the projected image. There are at least two drawbacks with this approach. First, the range of mechanical motion is small, so that the image has a pattern that is quickly repeated and does not provide the beneficial effects of motion which is random or pseudo-random. Second, the use of motors or other drive devices in multiple lighting devices mounted in an aircraft is costly and inevitably will lead to failures over time due to the numerous moving parts required.

Accordingly, there is a need for a low cost illumination device for producing illumination patterns simulating natural motion which also eliminates the need for moving parts used to generate such illumination patterns.

SUMMARY

In one aspect, a device for generating natural motion lighting patterns. At least two lighting elements are included, each lighting element outputting light. A first fixed common light modulation element is positioned above the at least two lighting elements. Finally, a controller has outputs coupled to the at least two lighting elements and is configured to separately vary an intensity of the light produced by each of the at least two lighting elements such that a light pattern produced by the light from each of the at least two lighting elements passing through the first fixed common light modulation element simulates natural motion. The at least two lighting elements may be light emitting diodes. The first fixed common light modulation element may be one of a lens, mask or filter. In a further embodiment, the device may also include a second fixed common light modulation element that is positioned between the at least two lighting elements and the first fixed common light modulation element. The second fixed common light modulation element may be one of a lens, mask or filter. In a further alternative embodiment, the device may also include separate fixed light modulation elements for each of the at least two lighting elements. The separate fixed light modulation elements may be one of a lens, mask or filter.

Further, the controller may be configured to vary the intensity of the at least two lighting elements such that the intensity of one of the at least two lighting elements is inversely proportional to the intensity of another of the at least two lighting elements. Still further, the controller may be further configured to vary the intensity of the at least two lighting elements according to a predetermined control function, with the predetermined control function applied to one of the at least two lighting elements out of phase with the predetermined control function applied to another of the at least two lighting elements. The predetermined control function may be one of a sine wave and a triangular wave. In a further embodiment, the predetermined control function may be modified by a noise function at predetermined intervals.

In another embodiment, the at least two lighting elements may form a first group and at least two additional lighting elements form a second group. In this case, the controller is also configured to separately vary an intensity of the light produced by each of the at least two additional lighting elements such that a light pattern produced by the light from each of the at least two additional lighting elements passing through the first fixed common light modulation element simulates natural motion. The controller may also configured to apply a first group intensity factor to the first group of lighting elements and a second group intensity factor, different from the first group intensity factor, to the second group of lighting elements. The first group intensity factor and the second group intensity factor may change at predetermined intervals.

In another aspect, a device for generating natural motion lighting patterns. At least two lighting elements are included, each lighting element outputting light. Separate light modulation elements are provided for each of the at least two lighting elements. Each separate light modulation element is positioned above the associated one of the at least two lighting elements. A controller is provided having outputs coupled to the at least two lighting elements and configured to separately vary an intensity of the light produced by each of the at least two lighting elements such that a light pattern produced by the light from each of the at least two lighting elements passing through the separate light modulation elements simulates natural motion.

In yet another aspect, a method for generating natural motion lighting patterns. A first lighting element is mounted below a first fixed common light modulation element. The intensity of a light output of the first lighting element is varied according to a first control function. A second lighting element is also mounted below the first fixed common light modulation element. The intensity of a light output of a second lighting element is varied according to a second control function. The second control function different from the first control function. The second control function may be an out of phase version of the first control function. The first control function may be one of a sine wave and a triangular wave. At least one of the first control function and the second control function may be modified by a noise function at a predetermined interval. The first control function may have a first fixed period and the second control function may have a second fixed period, different from the first fixed period. The predetermined interval may be one of the first fixed period and the second fixed period.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
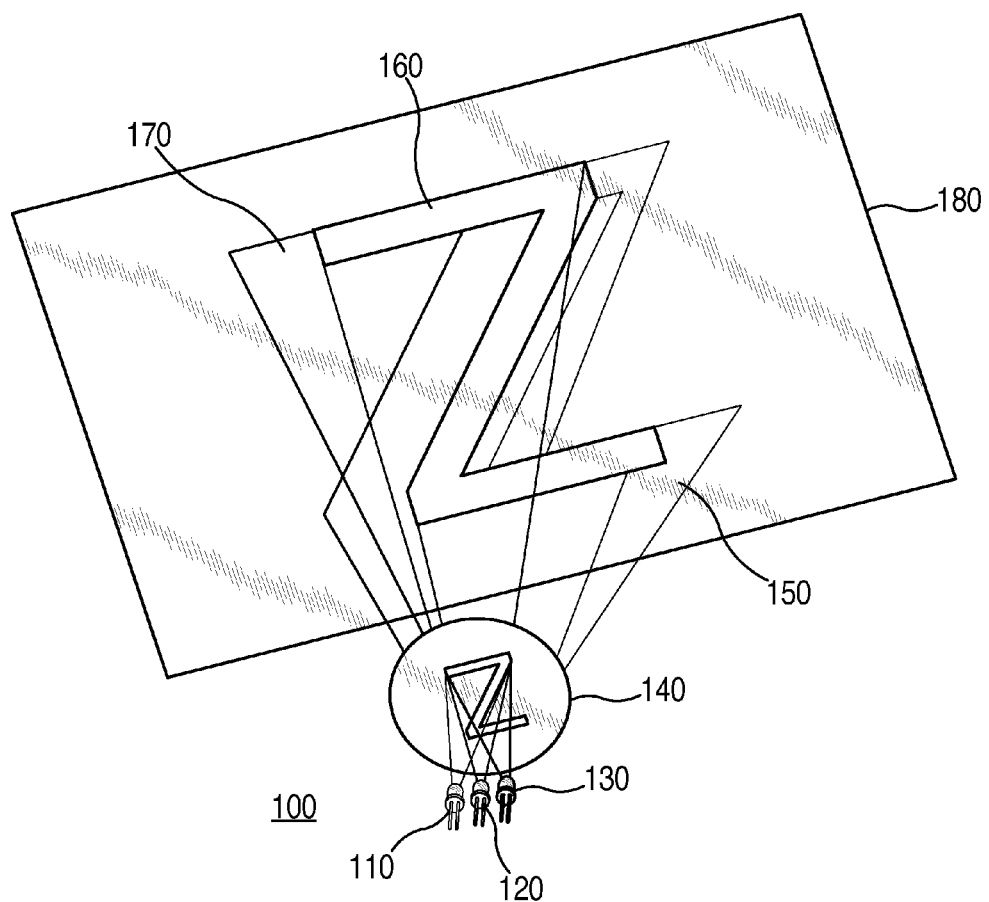
FIG. 1 is a diagram showing aspects of operation of an embodiment according to the present disclosure.

Referring now to the drawings, and in particular to FIG. 1, a diagram is provided showing the principles of operation of the lighting device of the present disclosure. In particular, the illumination system disclosed herein uses a control system (not shown in FIG. 1) to separately vary the illumination intensity of fixed light sources (e.g., LEDs 110, 120 and 130) that are mounted to project different illumination patterns through a light modulation element such as fixed mask 140. One or more filters or lenses may be used as a light modulation element, either instead of or in conjunction with fixed mask 140. In addition, although a common fixed mask 140 is shown in FIG. 1, each light source 110, 120, 130 may also (or alternatively) have one or more associated separate masks, filters or lenses. Each light source 110, 120, 130 produces a separate image 150, 160, 170, respectively, on a projection surface 180. By separately varying the intensities of the light sources 110, 120 and 130 via a control program (described below), the combination of the intensity variations in the light sources 110, 120 and 130 with the separate patterns created by the mask (and, optionally or alternatively, the filter or lens) can create an illumination pattern providing the illusion of natural motion. Although LEDs are shown as the light sources 110, 120, 130 in FIG. 1, any light source capable of having an intensity output modulated under control of a programmed controller may be used. As one of ordinary skill in the art will readily recognize, LEDs are particularly suitable for aircraft applications because of such devices have a lower energy consumption, longer lifetime, improved physical robustness, smaller size, and faster switching than other light sources.

The illumination device disclosed herein has general applicability in any application where light patterns simulating natural motion are desired. For example, when mounted over the valence in an interior of an aircraft, the illumination device disclosed herein can provide an engaging, relaxing, changing light pattern on the ceiling panels of the aircraft cabin. Several such devices may be used to cover larger areas by mounting the devices in a spaced apart relationship and with an overlapping illumination pattern. The natural motion provided by illumination device disclosed herein can be considered analogous to a field of grass moving in a light breeze or a light pattern formed from reflection or refractions from rippling water. As described in more detail below, this sensation is created by providing: (1) a particular pace of motion or change; (2) a general repetition to the pattern and appearance; (3) no discernible exact repetition to the pace of motion or the pattern; and (4) a slight randomness to a regular rhythm. When introduced into an aircraft cabin, the natural motion illumination pattern creates an illusion or reference to natural, outside light through motion and color, and thus creates a restful, mildly engaging experience to help passengers pass the time.

Figure 2A:
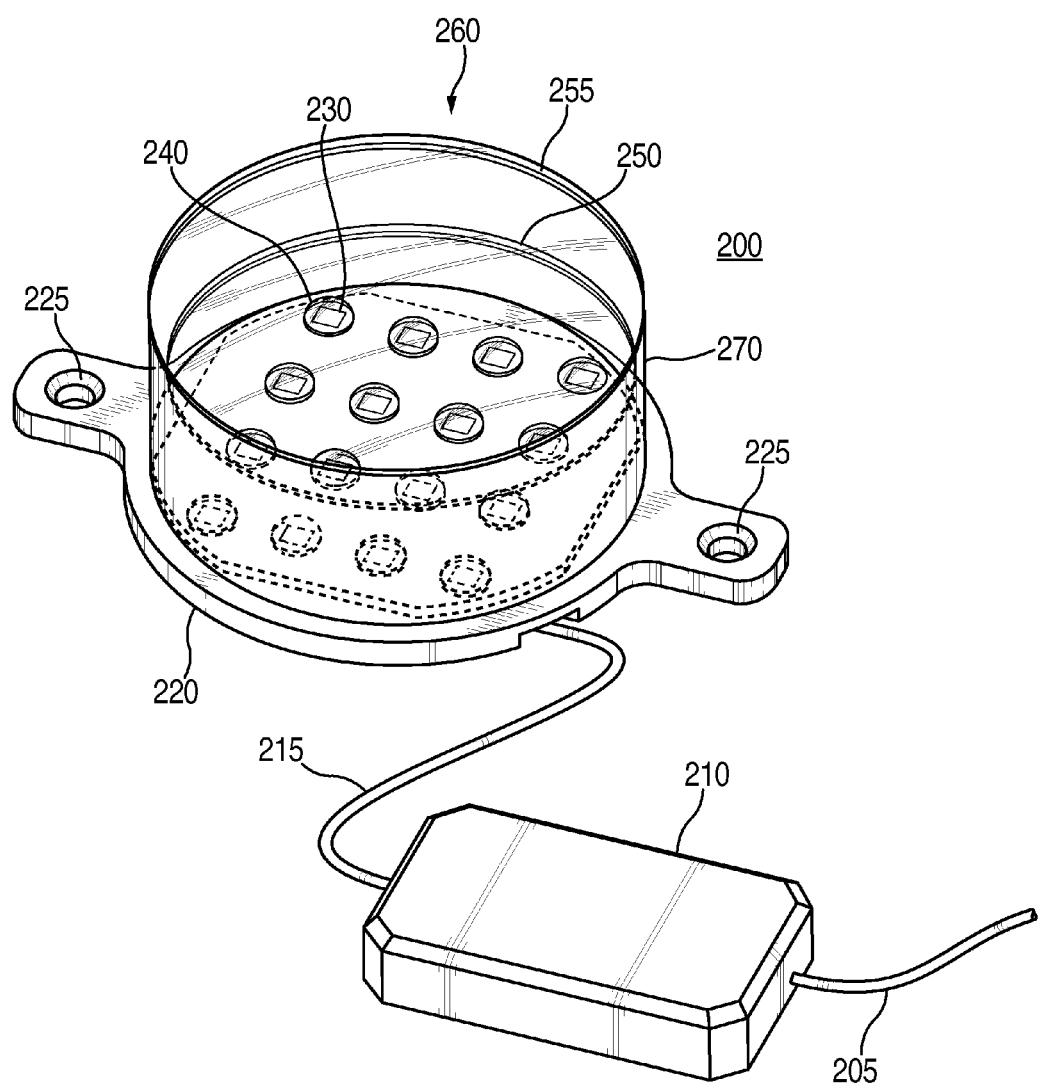
FIGS. 2A and 2B are perspective and side views, respectively, of a preferred embodiment of a lighting device according to the present disclosure.
Figure 2B:
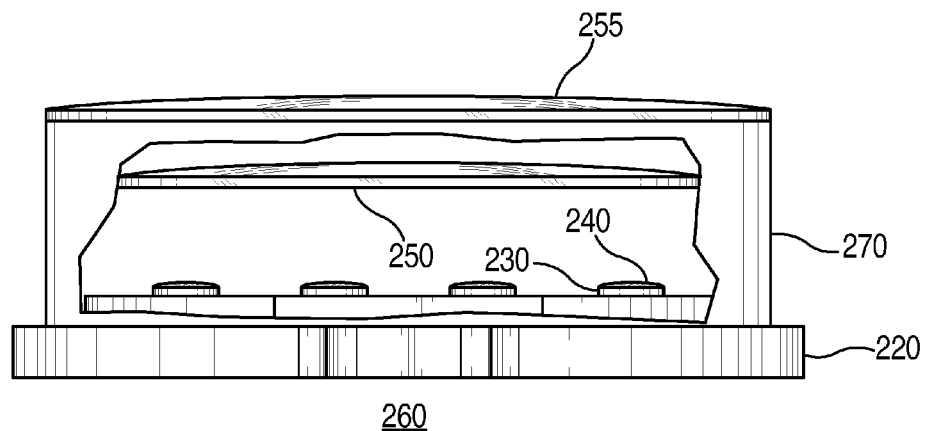

Referring now to FIGS. 2A and 2B, a presently preferred embodiment of an illumination device 200 is shown. In particular, device 200 includes a controller module 210 and a LED housing unit 260. A power cord 205 is coupled to controller module 210, and a cable 215 couples controller module 210 to LED housing unit 260. Power cord 205 may also include connectors for connecting to a master controller (not shown). The master controller may be used to upgrade the firmware in controller module 210 to, for example, change the illumination pattern. As one of ordinary skill in the art will readily recognize, in alternative embodiments the circuitry included in controller module 210 may be instead included within the LED housing unit 260. LED housing unit 260 preferably includes a base portion 220 and sidewall 270. Base portion 220 may include mounting apertures 225. A plurality of LED chips 230 are positioned across portion 220 (sixteen are shown in FIG. 2A). A separate light modulation element 240 may be mounted above each LED chip 230 to focus the light illuminated by the associated LED chip 230, although satisfactory operation may be obtained without such lens 240. Light modulation element 240 may be a lens, a mask or a filter. An optional common lower light modulation element 250 may be mounted in the sidewall 270 above the base portion 220 and above the LED chips 230. Lower light modulation element 250 may be a lens, a mask or filter, depending on the effects desired in the illumination pattern produced by device 200, and in some cases lower light modulation element 250 may be omitted. Finally, an upper light modulation element 255 may be mounted in sidewall 270 above lower light modulation element 250. As with the lower light modulation element 250, the upper light modulation element 255 may be a lens, a mask or filter, depending on the effects desired in the illumination pattern produced by device 200. Although two light modulation elements 250, 255 are shown in FIGS. 2A and 2B, in some circumstances a single light modulation element 250 may provide suitable operation. Furthermore, in some circumstances when separate light modulation elements 240 are included, the lower light modulation element 250 and the upper light modulation element may both be omitted.

In the preferred embodiment, upper light modulation element 255 is a refraction lens and lower light modulation element 250 is omitted. In other embodiments, upper light modulation element 255 and lower light modulation element 250 may both be refraction filters (or lenses). Preferably, each light modulation element 250, 255 may be a clear sheet with small color portions.

Although sixteen LED chips 220 are shown in FIG. 2A, adequate operation can be obtained with as few as two LED chips located in a spaced apart relationship. Although the LED chips 220 are shown in an array in FIG. 2A, the exact positioning of each LED chip 220 is not important so long as each LED chip 220 is spaced far enough apart from each other LED chip 220 so that each LED chip 220 produces a different image on the target surface.

Figure 3:
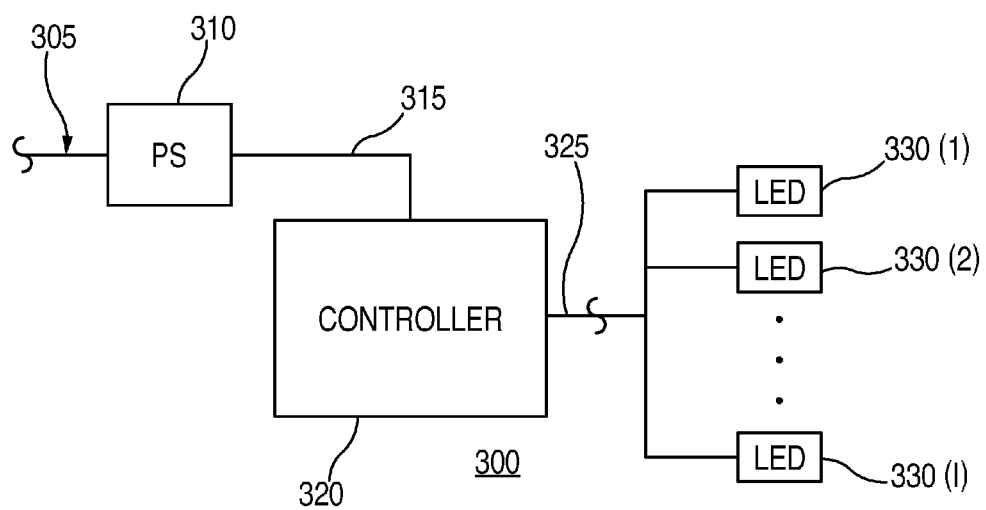
FIG. 3 is a block diagram of a preferred embodiment of a lighting device according to the present disclosure.

FIG. 3 is a block diagram of the circuitry 300 used in device 200 of FIG. 2A. In particular, a power connection 305 is coupled to an internal power supply 310, which provides power on line 315 for a controller 320. Power supply 310 is conventional and chosen based on the power requirements of controller 320 and of the power source coupled to power connection 305. Power supply 310 may be, for example, a voltage regulator when the voltage supplied on power connection 305 is a DC voltage. Controller 320 may be a programmed microcontroller, for example, having a series of outputs 325 (e.g., corresponding to the number of LEDs 330) that can each provide a varying output voltage (e.g., via an internal digital to analog converter) to an associated LED 330. Alternatively, separate digital to analog converters may be provided to drive each LED 330, each digital to analog converter coupled between a digital output on controller 320 and an associated LED 330. As evident to one of ordinary skill in the art, the intensity of the illumination provided by each of the LEDs 330(1), 330(2) . . . 330(I) can be varied by controlling the DC voltage on each associated output 325 via appropriate programming of controller 320. As one of ordinary skill in the art will readily recognize, there are many alternative ways to separately vary the intensity of each of the LEDs 330(1), 330(2) . . . 330(I) using a controller and any of such alternatives may be used with the system disclosed herein. In some circumstances, for example when the number of LED chips 220 (FIG. 2A) exceeds the number of outputs available on a desired controller, more than one controller may be used, each programmed to control the intensity of only the LED chips coupled thereto (e.g., each controller may control the intensity of half of the LED chips). In operation, as discussed below, controller 320 is programmed to separately and independently vary the intensity of each LED 330 via the associated output port 325.

Figure 4:
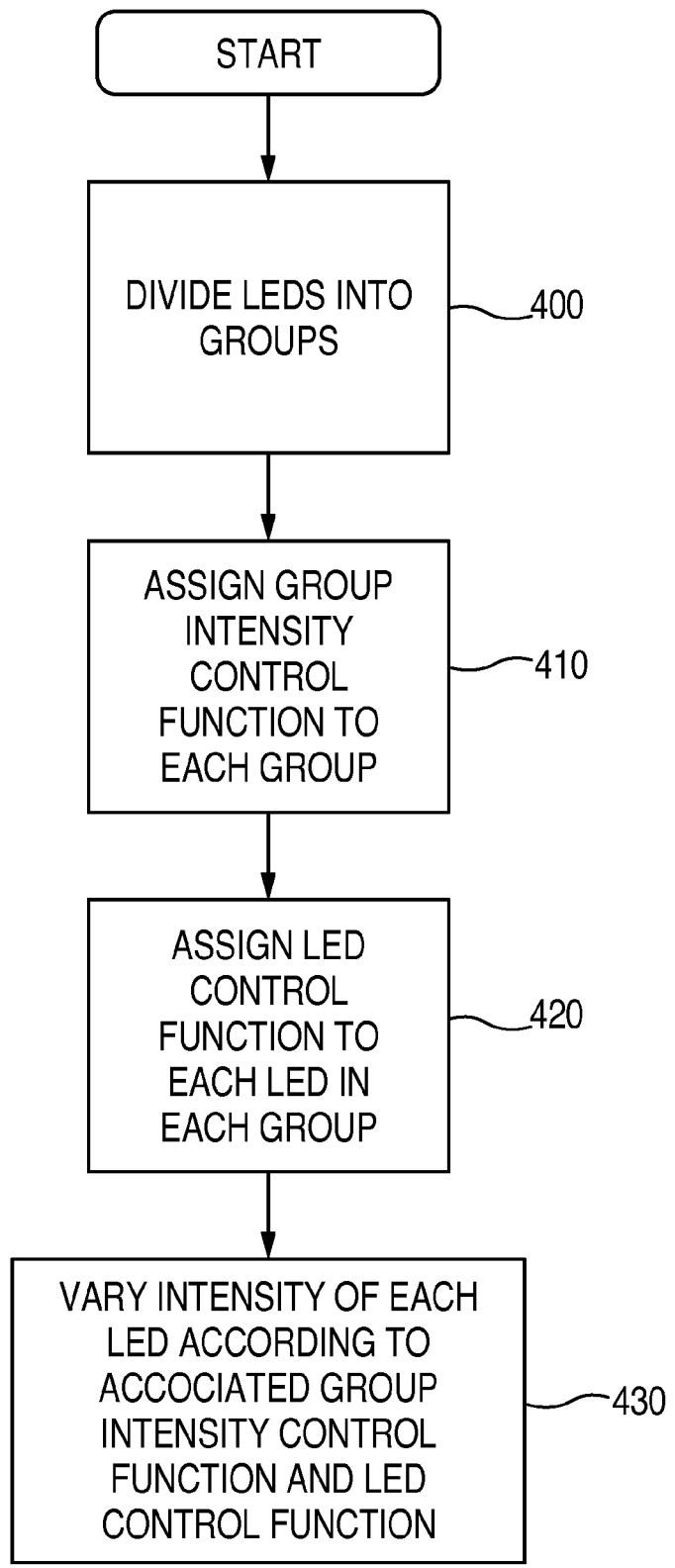
FIG. 4 is a flowchart showing the operation of a preferred embodiment of a lighting device according to the present disclosure.

As discussed above, light from a first light source shining through a lens, filter or mask produces a first pattern on a target surface, especially when the lens or filter has optical variations across its surface. A second light source positioned near the first light source produces a similar but slightly different pattern. When the intensities of these light sources are modulated in the manner discussed with respect to flowchart FIG. 4, the illusion of motion on the target surface may be created, without any moving parts or projectors. In particular, the LED chips 220 are first subdivided into smaller groups (step 400). For example, when there sixteen LED chips 220 as in FIG. 2A, eight groups of two LED chips 220 each may be identified. This division may be static, with each LED chip 220 always in a particular group, or may be dynamic, with the LED chips 220 randomly assigned to different groups at certain intervals. Next, at step 410, a group intensity control function is applied to each group. The group intensity control function is preferably a static power factor (which may change at predetermined repeat intervals). For example, when there are eight groups of LED chips 220, four different power factors may be used, 100% 50%, 30% and 20%, with each factor applied to two of the groups. Next, an LED control function is applied to each LED in each group, at step 420. The LED control function may be any repetitive varying signal, for example, a sine wave or triangular wave, and preferably has a different period and frequency for each group. In addition, the frequency or the amplitude or both the frequency and the amplitude LED control function may, in a further embodiment, be modified by an additional control function to provide additional natural character to the motion of the illumination patterns. Alternatively, the LED control function may consist of a blended combination of two separate control functions, with the amount of contribution of each separate control function modified by an additional control function. Further, the LED control function may be applied out of phase to each LED chip 220 in each group, so that, for example, the intensity of one LED chip 220 in the group increases as the intensity of another LED chip 220 in the group decreases proportionally (i.e., the two signals are inversely proportional to each other). Finally, at step 430, each LED chip 220 is varied according to the associated group intensity control function and LED control function. This process repeats at predetermined intervals, reassigning the group intensity control functions and LED control functions, to provide natural motion effects in the lighting patterns produced by the LED chips 220 on the target surface.

In some embodiments, the grouping may include a percentage of the total number of LED chips 220 (e.g., 80%) with the remaining LED chips 220 remaining off for the current cycle. Furthermore, the groups can be divided into two sets (e.g., each set having groups with each of the possible group intensity control functions), and with the intensity variation of the first set starting at a slightly different time than the second set so they are slightly out of phase. In an embodiment, the process repeats after a complete cycle of one of the LED control functions (e.g., a complete sine wave). In other embodiments, a timer may be used cause the process of FIG. 4 to repeat. In a further embodiment, the frequency of one or more of the LED control functions may be slightly modified with a noise function upon each repeat step. By grouping and separately controlling the pairs of LED chips 220, a changing and non-repeating pattern is provided that has a basic rhythm based on the groups with the highest group intensity control function but with influenced by the different frequencies of the other groups. As one of ordinary skill in the art will readily recognize, there are many other ways of modulating the intensity of the light output of the various LED chips 220 to similarly produce random non-repeating motion-like illumination patterns.

Figure 5:
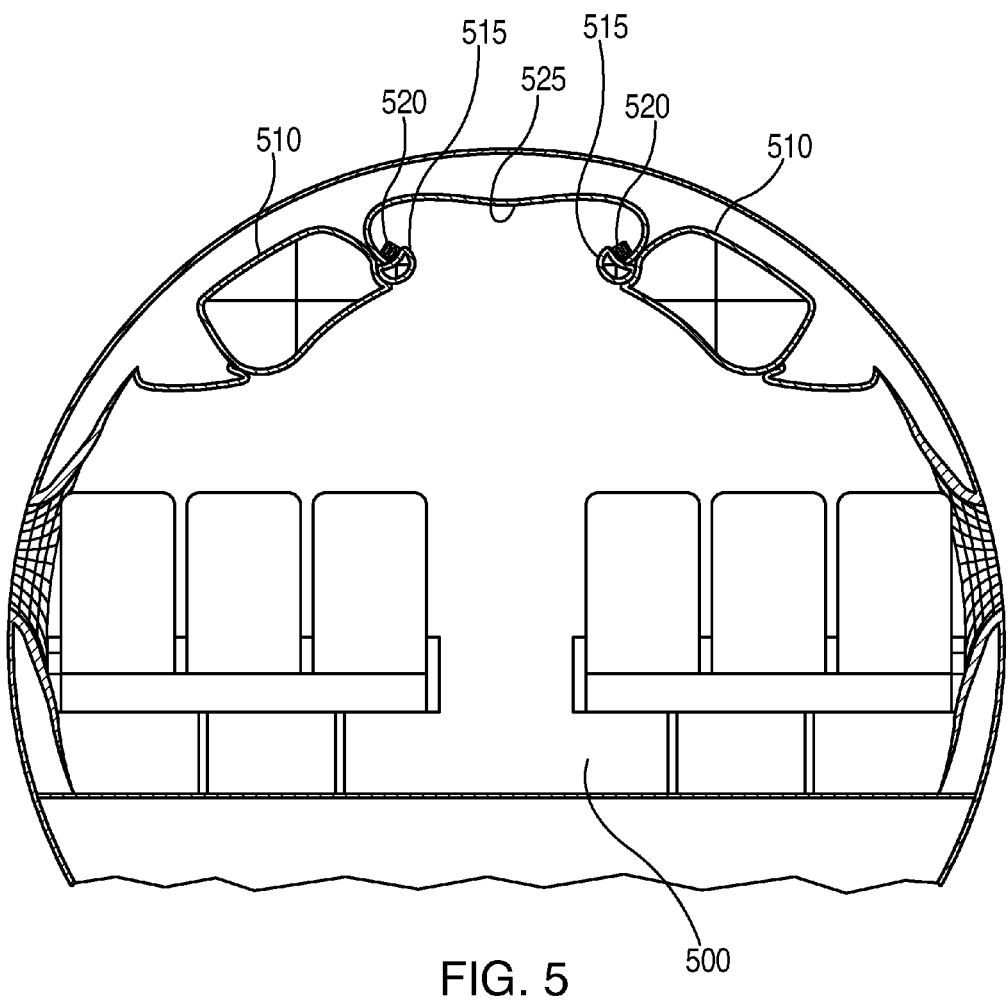
FIG. 5 is a cross-sectional end view of an airplane interior showing the placement of two devices according to the present disclosure.
Figure 6:
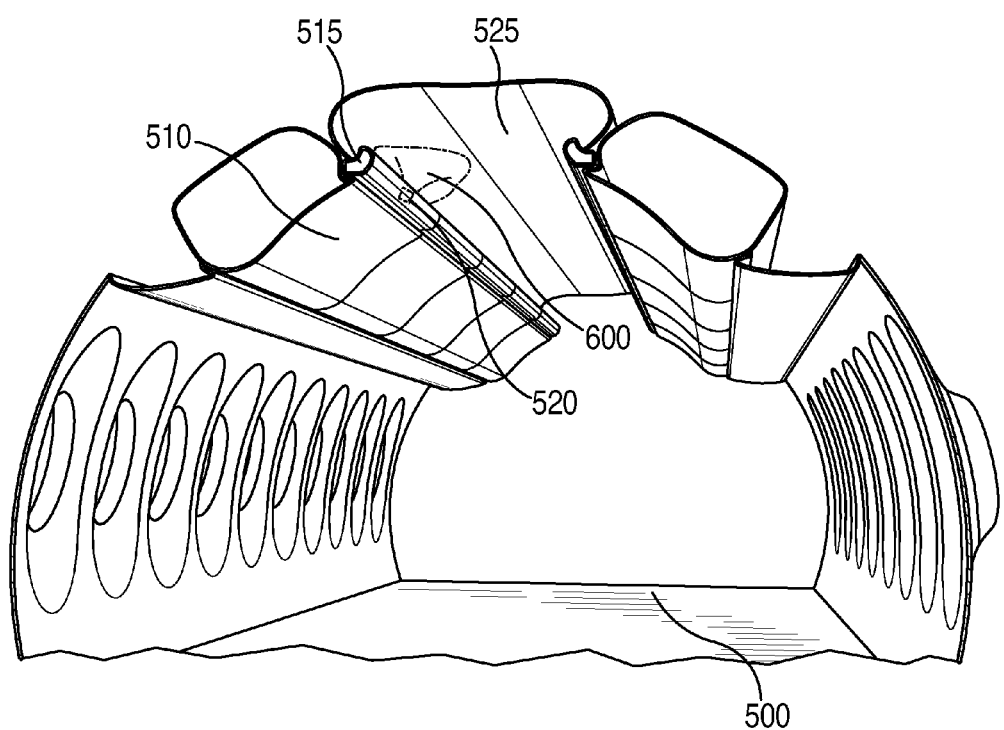
FIG. 6 is a perspective view of an airplane interior showing the illumination pattern generated by a single device according to the present disclosure.
Figure 7:
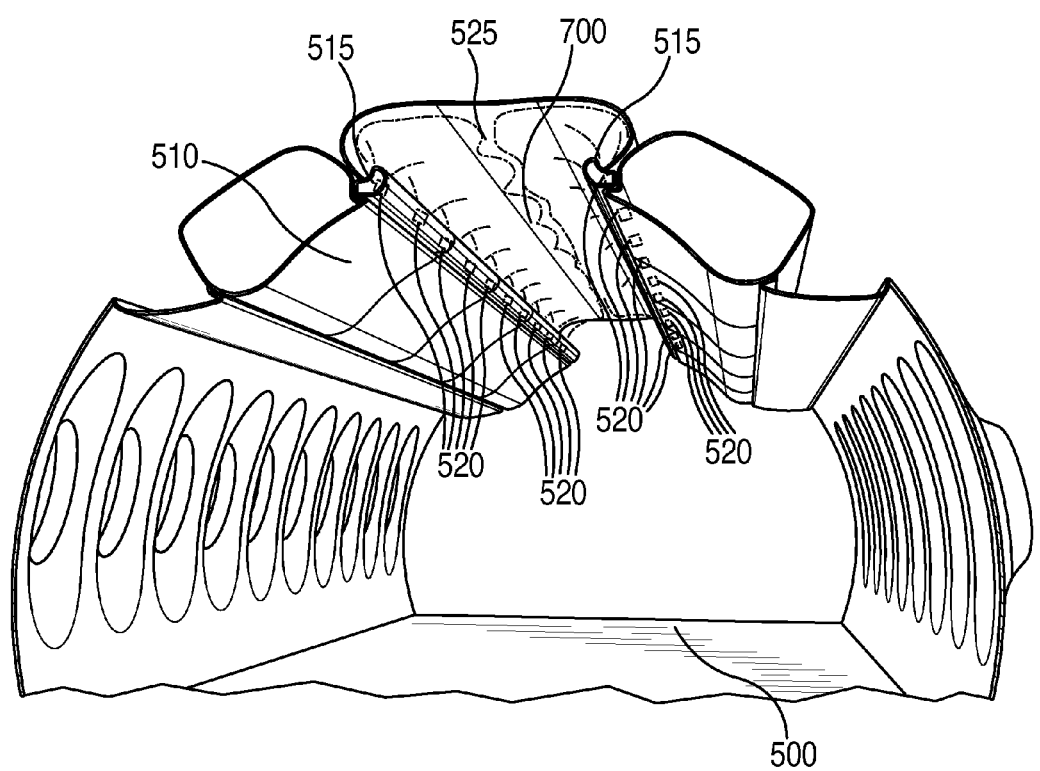
FIG. 7 is a perspective view of an airplane interior showing the illumination pattern generated by a plurality of devices according to the present disclosure.

Referring now to FIG. 5, two illumination devices 520 according to the present disclosure are shown mounted in an aircraft cabin 500. Each device 520 is mounted above a valence 515 mounted adjacent to the upper storage bins 510 and is directed at an adjacent portion of ceiling 525. FIG. 6 shows an illumination pattern 600 produced by a single illumination device according to the present disclosure at a single point in time. FIG. 7 shows the illumination pattern 700 produced by a plurality of illumination devices 520 mounted in the aircraft cabin. The use of such illumination devices 520 in an aircraft cabin will produce a wash lighting effect on the ceiling 525 of an aircraft that simulates natural motion and provides a positive effect on the mood and well-being of the passengers.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A device for generating natural motion lighting patterns, comprising:
   at least two lighting elements;
   a first fixed common light modulation element positioned above the at least two lighting elements; and
   a controller having outputs coupled to the at least two lighting elements and configured to separately vary an intensity of light produced by each of the at least two lighting elements such that changing lighting patterns produced on a target surface by the light from each of the at least two lighting elements passing through the first fixed common light modulation element simulate natural motion.

2. The device of claim 1, wherein each of the at least two lighting elements is a light emitting diode.

3. The device of claim 1, wherein the first fixed common light modulation element is one of a lens, mask or filter.

4. The device of claim 1, further comprising a second fixed common light modulation element positioned between the at least two lighting elements and the first fixed common light modulation element.

5. The device of claim 4, wherein the second fixed common light modulation element is one of a lens, mask or filter.

6. The device of claim 1, further comprising separate fixed light modulation elements for each of the at least two lighting elements.

7. The device of claim 6, wherein each of the separate fixed light modulation elements is one of a lens, mask or filter.

8. The device of claim 1, wherein the controller is further configured to vary the intensity of the at least two lighting elements such that the intensity of one of the at least two lighting elements is inversely proportional to the intensity of another of the at least two lighting elements.

9. The device of claim 1, wherein the controller is further configured to vary the intensity of the at least two lighting elements according to a predetermined control function, with the predetermined control function applied to one of the at least two lighting elements out of phase with the predetermined control function applied to another of the at least two lighting elements.

10. The device of claim 9, wherein the predetermined control function is one of a sine wave and a triangular wave.

11. The device of claim 9, wherein the predetermined control function is modified by a noise function at predetermined intervals.

12. The device of claim 1, wherein the at least two lighting elements form a first group; further comprising at least two additional lighting elements, each additional lighting element outputting light, the at least two additional lighting elements forming a second group;
   and wherein the controller is also configured to separately vary an intensity of the light produced by each of the at least two additional lighting elements such that a light pattern produced by the light from each of the at least two additional lighting elements passing through the first fixed common light modulation element simulates natural motion.

13. The device of claim 12, wherein the controller is also configured to apply a first group intensity factor to the first group of lighting elements and a second group intensity factor, different from the first group intensity factor, to the second group of lighting elements.

14. The device of claim 13, wherein the first group intensity factor and the second group intensity factor change at predetermined intervals.

15. A device for generating natural motion lighting patterns, comprising:
   at least two lighting elements;
   separate light modulation elements for each of the at least two lighting elements, each separate light modulation element positioned above the associated one of the at least two lighting elements; and
   a controller having outputs coupled to the at least two lighting elements and configured to separately vary an intensity of light produced by each of the at least two lighting elements such that changing lighting patterns produced on a target surface by the light from each of the at least two lighting elements passing through the separate light modulation elements simulate natural motion.

16. A method for generating natural motion lighting patterns, comprising the steps of:
   varying an intensity of a light output of a first lighting element according to a first control function, the first lighting element mounted below a first fixed common light modulation element; and
   varying an intensity of a light output of a second lighting element according to a second control function, the second lighting element mounted below the first fixed common light modulation element, the second control function different from the first control function;
   wherein changing lighting patterns produced on a target surface by the light outputs of the first and second lighting elements simulate natural motion.

17. The method of claim 16, wherein the second control function is an out of phase version of the first control function.

18. The method of claim 17, wherein the first control function is one of a sine wave and a triangular wave.

19. The method of claim 16, further comprising the step of modifying at least one of the first control function and the second control function by a noise function at a predetermined interval.

20. The method of claim 19, wherein the first control function has a first fixed period and the second control function has a second fixed period, different from the first fixed period, and wherein the predetermined interval is one of the first fixed period and the second fixed period.

* * * * *